United States Patent

[11] 3,600,952

| | | | |
|---|---|---|---|
| [72] | Inventor | Howard R. Jaquith<br>Rochester, N.Y. | |
| [21] | Appl. No. | 871,874 | |
| [22] | Filed | Oct. 28, 1969 | |
| [45] | Patented | Aug. 24, 1971 | |
| [73] | Assignee | Sybron Corporation<br>Rochester, N.Y. | |

[54] PRESSURE TRANSMITTER
2 Claims, 1 Drawing Fig.

[52] U.S. Cl. ................................................ 73/406
[51] Int. Cl. ................................................. G01l 7/08
[50] Field of Search ................................... 73/388 BN,
407, 406, 409, 418; 92/90, 96

[56] References Cited
UNITED STATES PATENTS
2,369,650  2/1945  Allen ........................... 73/410

*Primary Examiner* — Donald O. Woodiel
*Attorney* — Theodore B. Roessel

ABSTRACT: Disclosed is a pressure transmitter having a sealing diaphragm fixed about a high pressure opening with a force beam upstanding from the sealing diaphragm, the flexures provided for absorbing axial thrust of the diaphragm being offset from the axis of the beam so that the beam is angularly deflected responsive to expansion of the diaphragm.

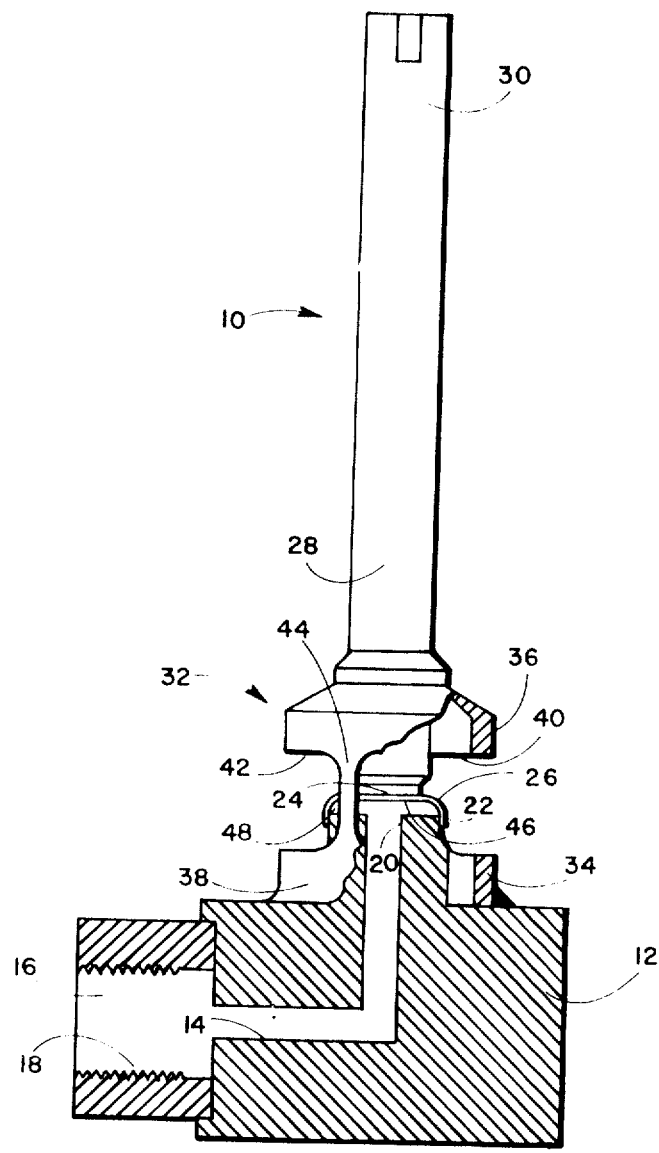

3,600,952

PRESSURE TRANSMITTER

BACKGROUND OF THE INVENTION

The present invention relates to a gauge pressure transmitter and, more specifically, to a gauge pressure transmitter which utilizes deflection of a sealing diaphragm to develop a torque on a force beam wherein the torque is an indication of the pressure on the diaphragm.

Conventional means for indicating pressure in a sealed region are well known in the art and it is sufficient for purposes of the present invention merely to say that such means may include a bellows member exposed to the pressure within the sealed region and, a force beam extending into the sealed region and linked to the bellows. In operation, the pressure in the sealed region pushes against the bellows to develop a torque on a force beam which is transmitted by the force beam to a device outside of the sealed region which interprets the torque in terms of pressure.

While such construction had several advantages, the measurement of the pressure in the sealed region containing corrosive materials requires that the bellows, the portion of the force beam in the sealed region and any connecting links be made of noncorrosive materials. Exposure of these members to the process in the sealed region also required that they be protected against fouling by process materials.

The gauge pressure transmitter of the present invention, however, eliminates the need for bellows within the sealed region, the extension of the force beam into the sealed region and the connecting linkage and instead utilizes solely the deformation of a diaphragm which seals an opening into the sealed region to create a torque on the force beam.

SUMMARY OF THE INVENTION

The pressure transmitter of the present invention may be characterized in one aspect thereof by the provision of a force beam upstanding from a sealing diaphragm. Flexure members, provided for preventing axial thrust of the force beam responsive to the pressure in the sealed region, are offset from the axis of the force beam so that the high pressures in the sealed region, when applied to the small area of the sealed diaphragm causes the force beam to deflect angularly to generate a torque in the force beam.

OBJECTS OF THE INVENTION

One object of the present invention is to provide a pressure transmitter for transmitting torque from a sealed region to an external point.

Another object of the present invention is to provide a pressure transmitter wherein torque is applied directly to the force beam by the sealing diaphragm.

A further object of the present invention is to provide a pressure transmitter wherein the flexures for absorbing axial thrust of the pressure on the sealing diaphragm are offset with respect to the axis of the force beam in order to control the torque created in the force beam responsive to pressure on the sealing diaphragm.

Yet another object of the present invention is to provide a pressure transmitter which eliminates the need of exposing a portion of the force beam to the environment of the sealed region.

These and other objects, advantages and characterizing features will become more apparent upon consideration of the following more detailed description thereof when taken in connection with the accompanying drawings.

DESCRIPTION OF THE DRAWINGS

The sole FIGURE is an elevation view partly in section of the pressure transmitter of the present invention.

DESCRIPTION OF THE PREFERRED EMBODIMENT

Referring to the drawing, the sole FIGURE shows the pressure transmitter of the present invention generally indicated at 10. Pressure transmitter 10 includes a body member 12 having a bore 14 therein. One end 16 of the bore is adapted for connection to a sealed region for purposes of providing a communication of the bore with the pressure within the sealed region. In this respect, bore end 16 may be provided with internal threads 18 for connecting the body and bore to a corresponding male connector (not shown) leading into the sealed region.

The other end 20 of bore 14 is sealed by a sealing diaphragm 22 which is welded to the body member 12 about the periphery of bore opening 20. Welded at 24 to the relatively flat upper surface 26 of the sealing diaphragm 22 is an up right force beam 28. Preferably, the force beam is centrally located on the sealing diaphragm. The remote end 30 of the force beam is connected to any conventional means (not shown) well known in the art which is capable of interpreting a torque in the force beam in terms of pressure within the sealed region.

In order to prevent axial movement of the force beam, a cylindrical member generally indicated at 32 is provided for restraining the force beam against the axial thrust of pressure of the sealing diaphragm while permitting angular deflection of the force beam. Member 32 is preferably a hollow cylinder made from a material having a high tensile strength.

The annular sidewall 34 of member 32 has one end at 36 36 welded about force beam 28 and the other end 38 welded to body member 12 about bore opening 20. Annular wall 34 has a pair of diametrically opposed notches 40 and 42 respectively which are isolated from one another by thin strips 44 of wall material, one strip being on either side of the force beam. These strips or flexure are of sufficient tensile strength to prevent axial movement of the force beam responsive to the thrust of the pressure acting upon sealing diaphragm 22. Preferably, the axial length of the notches includes the plane of sealing diaphragm 22 so that the diaphragm is exposed through wall 34 with strips 44 passing vertically through the plane of the diaphragm. As shown in the drawing, one notch 40 removes a greater portion of wall material than the other notch 42 so that the flexures 44 are offset with respect to the axis of force beam 28 and lie in a chordal plane of the annular wall 34. With flexures 44 being offset from the force beam, a greater portion 46 of the effective area of sealing diaphragm 22 extends into notch 40 while a lesser portion 48 of the effective area of sealing diaphragm 22 extends into notch 42. With this arrangement, the pressure within the sealed region acting on the different effective areas of diaphragm 22 will tend to tilt the force beam in a direction normal to the chordal plane of flexure strips 44. Moreover, since the flexure strips pass vertically through the plane of the diaphragm, the tilt of the force beam will be about an axis lying parallel to and adjacent the plane of the diaphragm so that a small inclination at the base of the force beam will tend to produce a larger deflection at the remote end 30 so as to magnify the torque output of the force beam.

The direction of the angular deflection of the force beam will depend upon the sense of the pressure. For example, if, in the present invention, the pressure inside is greater than the pressure outside the sealed region, the beam will tend to tip to the left as viewed in the FIGURE. An internal pressure lower than the external pressure, however, will tend to tip the beam to the right as viewed in the FIGURE.

The amount of offset flexure strips may be accurately controlled in order to control the sensitivity of the device. For example, increasing the amount of offset from the axis of force beam 28 would allow a given pressure change within the sealed region to tilt the force beam through a greater arc, whereas reducing the amount of offset results in a corresponding decrease in the amount of tilt for the same pressure change.

Accordingly, it should be appreciated that the present invention accomplishes its intended objects, providing a pressure transmitter in which the deflection of the sealing diaphragm is applied directly to a force beam so as to eliminate the need for the extension of the force beam into the sealed region together with components such as bellows and connecting linkages within the sealed region. The use of offset flexures 44 not only permits the sealing diaphragm to create a torque directly on the force beam but also the amount of offset provides a measure of control over the sensitivity of the pressure transmitter.

Further, the use of offset flexures provides a compact design which permits high pressure spans which otherwise could not be obtained practically with a conventional bellows design.

Having thus described the invention, what is claimed as new is:

1. A force balance device comprising:
  a. a body member having a bore therein, said bore having a first opening communicating with a closed region and a second opening;
  b. a sealing diaphragm fixed to said body about said second bore opening;
  c. a force beam upstanding from said diaphragm;
  d. a cylinder defined by an annular wall extending about said upright force beam, said cylinder having one end fixed to said beam end and another end fixed to said body member about said diaphragm to restrain axial movement of said force beam; and
  e. said annular wall having a pair of diametrically opposed notches therein intermediate the ends of said cylinder with each notch isolated one from another by axial portions of said wall, one of said notches extending radially inward beyond the axis of said cylinder to offset said axial wall portions from the axis of said cylinder so that a greater part of the effective area of said diaphragm lies in said one notch than in the other of said notches, said offset axial wall portions restraining axial movement of said force beam while permitting said force beam to deflect angularly in a direction normal to the plane of said axial wall portions and corresponding to the sense of a pressure in said closed region applied to said sealing diaphragm.

2. A device as in claim 1 wherein the plane of said diaphragm passes through said notches.